United States Patent
Sonasath et al.

(10) Patent No.: US 12,135,738 B2
(45) Date of Patent: Nov. 5, 2024

(54) SYSTEM AND METHOD FOR CYBERBULLYING DETECTION

(71) Applicant: SAMSUNG ELECTRONICS CO., LTD., Suwon-si (KR)

(72) Inventors: Moiz Kaizar Sonasath, Sunnyvale, CA (US); Vinod Cherian Joseph, Fremont, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/355,978

(22) Filed: Jun. 23, 2021

(65) Prior Publication Data

US 2021/0397638 A1 Dec. 23, 2021

Related U.S. Application Data

(60) Provisional application No. 63/042,936, filed on Jun. 23, 2020.

(51) Int. Cl.
| | |
|---|---|
| *G06F 16/35* | (2019.01) |
| *G06F 16/332* | (2019.01) |
| *G06F 16/335* | (2019.01) |
| *G06N 3/045* | (2023.01) |
| *H04L 51/52* | (2022.01) |

(52) U.S. Cl.
CPC .......... *G06F 16/35* (2019.01); *G06F 16/3329* (2019.01); *G06F 16/335* (2019.01); *G06N 3/045* (2023.01); *H04L 51/52* (2022.05)

(58) Field of Classification Search
CPC ..... G06F 16/35; G06F 16/3329; G06F 16/335
See application file for complete search history.

(56) References Cited

U.S. PATENT DOCUMENTS

| | | | | |
|---|---|---|---|---|
| 2007/0230787 | A1* | 10/2007 | Belitskaya | G06V 30/268 382/182 |
| 2008/0181396 | A1* | 7/2008 | Balakrishnan | G06F 21/6209 380/28 |
| 2012/0151046 | A1* | 6/2012 | Weiss | G06F 21/604 709/224 |
| 2014/0040154 | A1* | 2/2014 | Webb | G06Q 90/00 705/325 |
| 2014/0283097 | A1* | 9/2014 | Allen | G06F 21/6254 726/26 |
| 2015/0365366 | A1 | 12/2015 | Prabhu | |
| 2017/0323410 | A1 | 11/2017 | Donovan | |
| 2018/0189559 | A1 | 7/2018 | Lee et al. | |
| 2018/0239918 | A1* | 8/2018 | Koo | G06F 21/6209 |
| 2019/0182280 | A1* | 6/2019 | La Marca | H04L 43/16 |
| 2020/0020447 | A1 | 1/2020 | Generoso et al. | |

* cited by examiner

*Primary Examiner* — Kannan Shanmugasundaram
(74) *Attorney, Agent, or Firm* — Sughrue Mion, PLLC

(57) ABSTRACT

A method for identifying cyberbullying may include obtaining content from a first electronic device associated with a first user; identifying, using a machine learning model, the cyberbullying of the first user based on the content obtained from the first electronic device; and providing anonymized information related to the cyberbullying to a second electronic device associated with a second user.

18 Claims, 15 Drawing Sheets

SYSTEM AND METHOD FOR CYBERBULLYING DETECTION

CROSS-REFERENCE TO RELATED APPLICATION(S)

This application is based on and claims priority under 35 U.S.C. § 119 to U.S. Provisional Patent Application No. 63/042,936, filed on Jun. 23, 2020, in the U.S. Patent & Trademark Office, the disclosure of which is incorporated by reference herein in its entirety.

BACKGROUND

1. Field

The disclosure relates to a system and method for cyberbullying detection.

2. Description of Related Art

Techniques for detecting cyberbullying tend to identify each and every interaction on social media as a browser plugin or keyboard plugin and block usage as an action to prevent bullying. Further, these techniques sacrifice the user's privacy and digital citizenship rights which can cause a user to feel as being constantly controlled. Accordingly, users tend to disable these solutions.

SUMMARY

According to an aspect of an example embodiment, a method for identifying cyberbullying may include obtaining content from a first electronic device associated with a first user; identifying, using a machine learning model, the cyberbullying of the first user based on the content obtained from the first electronic device; and providing anonymized information related to the cyberbullying to a second electronic device associated with a second user.

According to an aspect of an example embodiment, device for identifying cyberbullying may include a memory configured to store instructions; and a processor configured to execute the instructions to: obtain content associated with a first user; identify, using a machine learning model, the cyberbullying of the first user based on the content; and provide anonymized information related to the cyberbullying to an electronic device associated with a second user.

According to an aspect of an example embodiment, a non-transitory computer-readable medium may store instructions that, when executed by one or more processors of a device for identifying cyberbullying, cause the one or more processors to: obtain content associated with a first user; identify, using a machine learning model, the cyberbullying of the first user based on the content; and provide anonymized information related to the cyberbullying to an electronic device associated with a second user.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
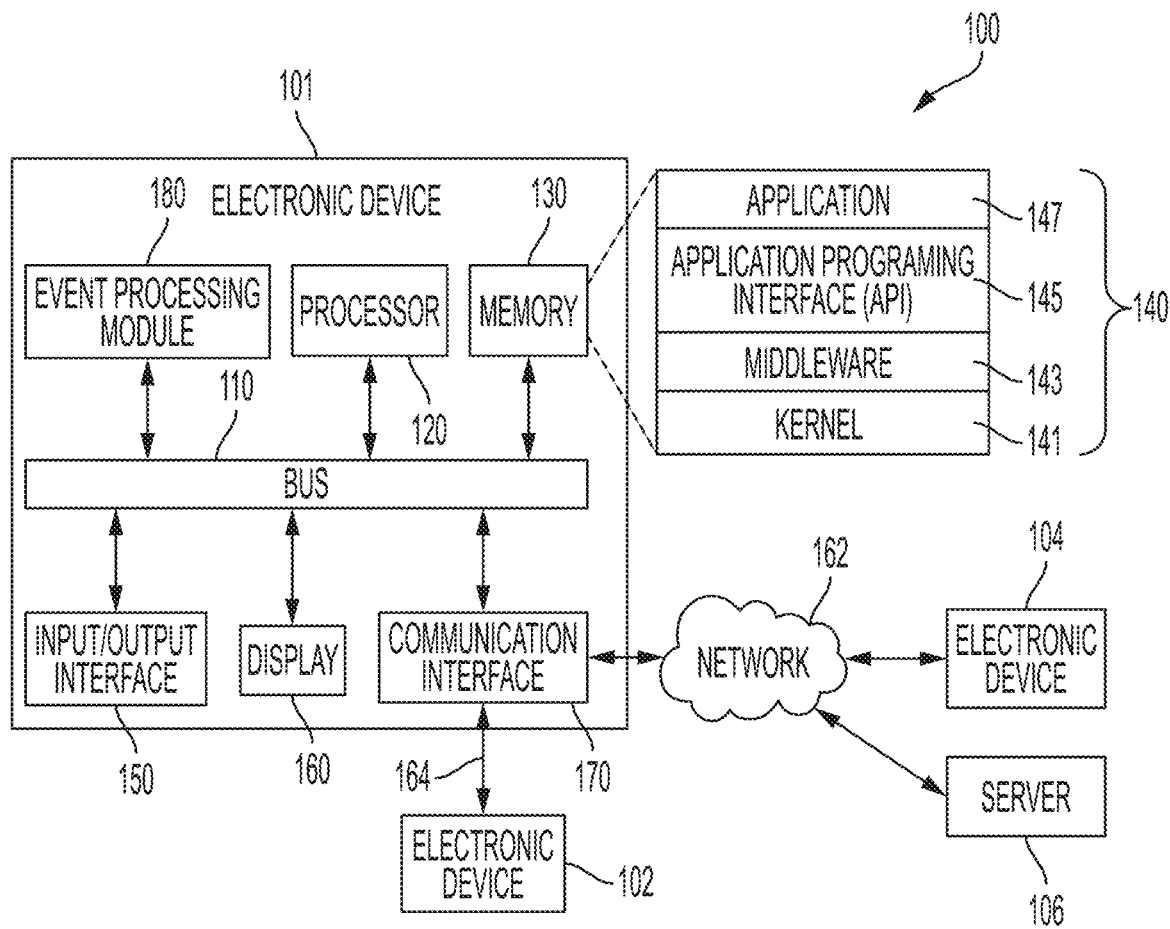
FIG. 1 is a diagram of an environment according to an example embodiment.

FIG. 1 is a diagram of an environment according to an example embodiment.

Referring to FIG. 1, according to an embodiment of the present disclosure, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 or 164 through wireless or wired communication to communicate with the external electronic device.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 may detect the mounting in the HMD and operate in a virtual reality mode. When the electronic device 101 is mounted in the electronic device 102 (e.g., the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally.

To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 may be independently operated without a separate communication function, according to an embodiment of the present disclosure.

For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present disclosure in interoperation with at least one program 140 stored in the memory 130.

Figure 2:
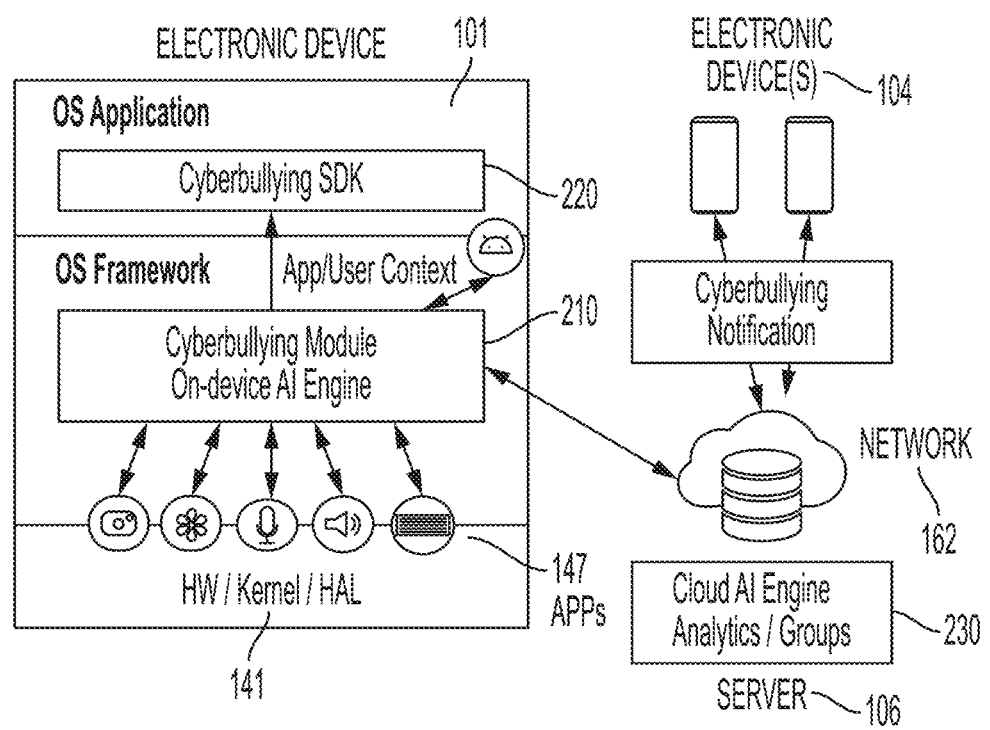
FIG. 2 is a diagram of an environment according to an example embodiment.

FIG. 2 is a diagram of an environment according to an example embodiment. As shown in FIG. 2, the electronic device 101, the electronic device 104, and the server 106 may communicate via the network 162.

As shown, the electronic device 101 may include a cyberbullying module 210 (e.g., an on-device AI engine) that interfaces with applications 147 (e.g., a camera application, a gallery application, a microphone application, a speaker application, a keyboard application, a web-browsing application, a gaming application, etc.) via the kernel 141 of the electronic device 101. Further, as shown, the cyberbullying module 210 may interface with third-party applications 147 (e.g., a social media application, a gaming application, etc.) via a cyberbullying software development kit (SDK) 220. The server 106 may include a cloud AI engine 230. The cloud AI engine 230 may perform some of, all of, or different operations of the cyberbullying module 210. The server 106 may transmit a cyberbullying notification to the electronic device 104.

Figure 3:
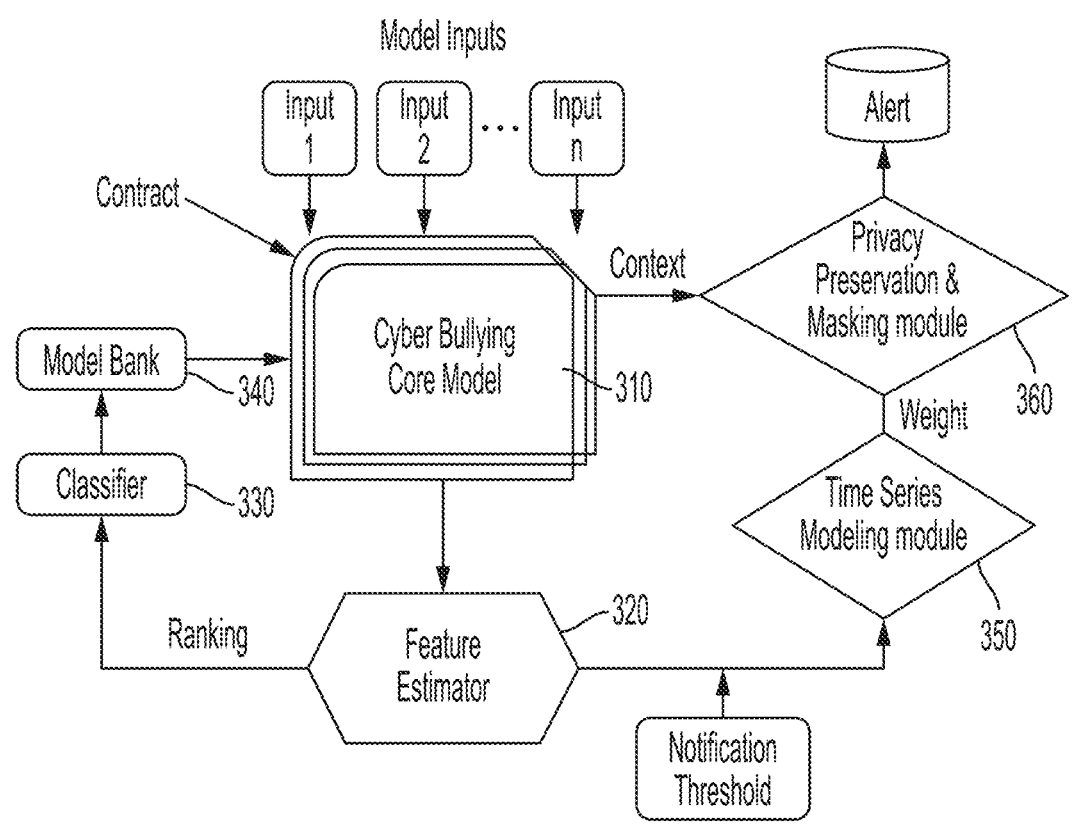
FIG. 3 is a diagram of an artificial intelligence (AI) model for detecting cyberbullying according to an example embodiment.

FIG. 3 is a diagram of an artificial intelligence (AI) model for detecting cyberbullying according to an example embodiment. As shown in FIG. 3, an AI model 300 for detecting cyberbullying may include a cyberbullying core model 310, a feature estimator 320, a classifier 330, a model bank 340, a time series modeling module 350, and a privacy preservation and masking module 360.

Figure 4:
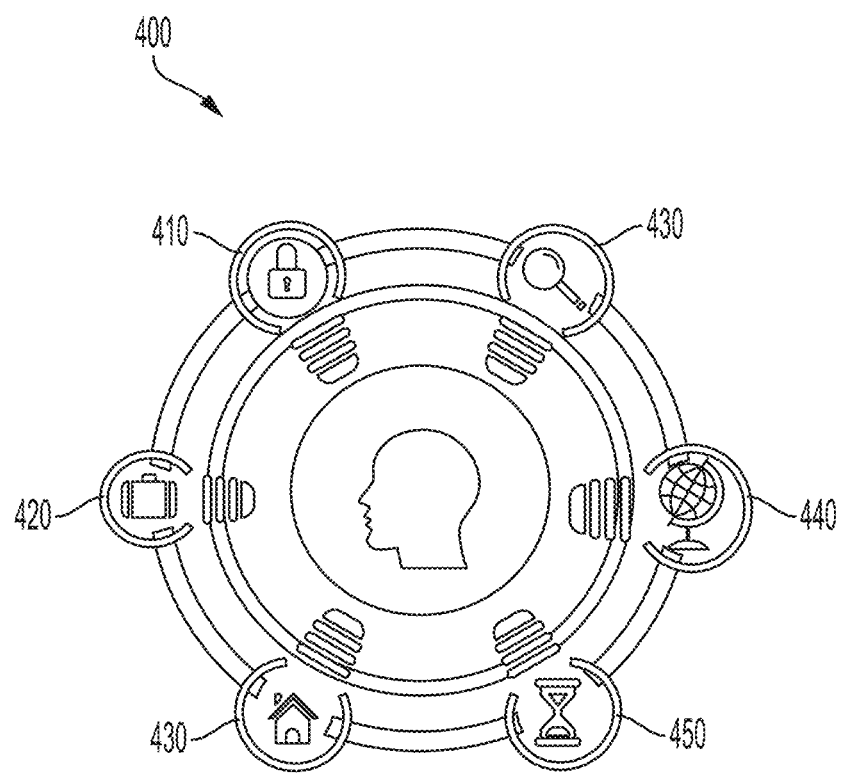
FIG. 4 is a diagram of content according to an example embodiment.

FIG. 4 is a diagram of content according to an example embodiment. The content 400 may include security data 410, user activity data 420, device data 430, location data service data 440, social data 450, and behavioral model data 460.

The security data 410 may include authentication and authorization data of a user of the electronic device 101, and may be used to detect and mask the user's identity to ensure privacy. The user activity data 420 may include data associated with activities and usage of the electronic device 101, and may be used to measure anomalies in user patterns and daily usage behavior. The device data 430 may include application data, keyboard data, camera data, etc., and may be used to observe anomalies an abuse patterns. The location data service data 440 may include location data of the electronic device 101, and may be used to track the electronic device 101 and predict abuse based on historical data patterns. Further, the location data service 440 may be used to determine whether the electronic device 101 is located within a predetermined geo-fence according to an agreement between the user of the electronic device 101 and a user of the electronic device 104. The social data 450 may include social data of the user of the electronic device 101, and may be used to derive sentiment and anomalies based on the user's context and classification to derive deviation from predicted patterns and modalities. The behavioral model data 460 may be used in association with a generative adversarial network (GAN) for adversarial behavior with weights for actors and attributes, and may be used to measure drift and define thresholds for notification.

Figure 5:
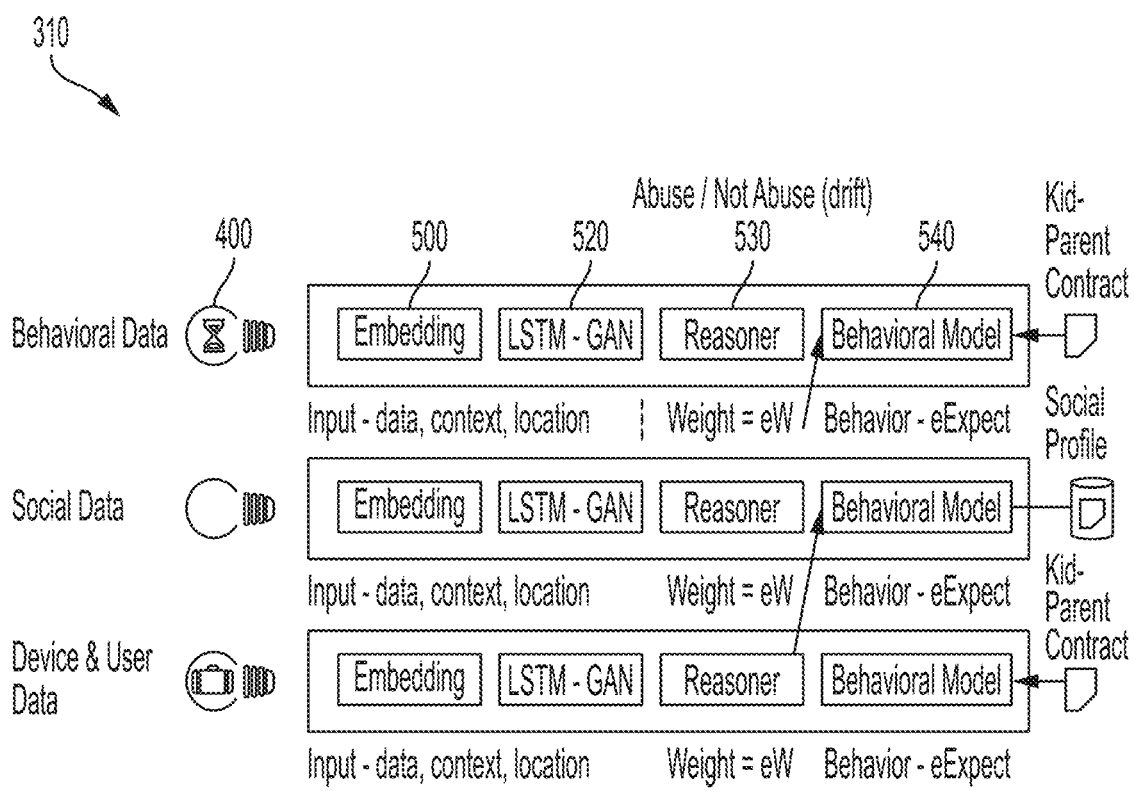
FIG. 5 is a diagram of a cyberbullying core model according to an example embodiment.

FIG. 5 is a diagram of a cyberbullying core model according to an example embodiment. The cyberbullying core model 310 may be configured to obtain content 400, and detect cyberbullying. For example, as shown, the cyberbullying core model 310 includes one or more embedding modules 510, one or more long short-term memory (LSTM)-GANs 520, one or more reasoners 530, and one or more behavioral models 540. Each input of content 400 is collected and pre-processed by an embedding module 510 using corresponding data specific embeddings, and processed through an LSTM-GAN 520 for ranking and prediction. The cyberbullying core model 310 uses the pre-agreed contract between the user of the electronic device 101 (e.g., a child) and the user of the electronic device 104 (e.g., a parent) as a reference along with the group behavioral model 540 obtained through corresponding social profile data, and applies the reasoned 530 to detect a specific instance of cyberbullying.

Figure 6:
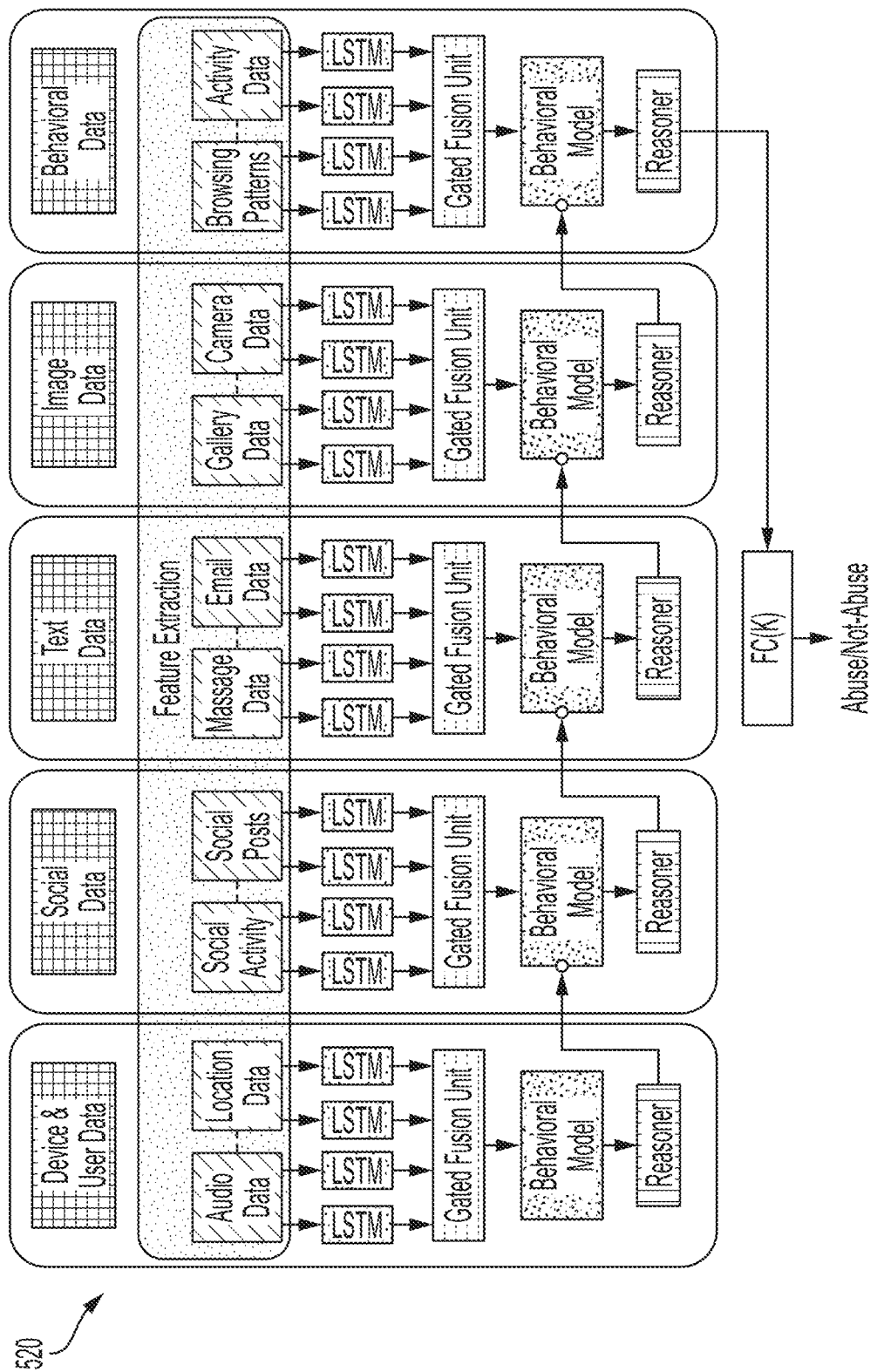
FIG. 6 is a diagram of a hierarchical LSTM-GAN according to an example embodiment.

FIG. 6 is a diagram of a hierarchical LSTM-GAN according to an example embodiment. The LSTM-GAN 520 may include a generator that generates fake data for a corresponding input category with sequences from a random latent space and passes the generated sequence samples to a discriminator which tries to distinguish the "fake" data sequences from the actual ("real") training data sequences. Both the GAN-trained discriminator and generator are then applied to compute an anomaly score based on discrimination and reconstruction. Given a training dataset $X \subseteq R^{M \times N}$ with M inputs and N measurements for each input, and a testing dataset $Xtest \subseteq R^{S \times T}$ with S inputs and T measurements for each input, the task is to assign binary (e.g., "0" for normal and "1" for anomalous) labels to the measurements of the testing dataset. The generator and discriminator of the GAN are Long Short Term-Recurrent Neural Networks (LSTM-RNNs) for text and LSTM-CNNs for visual features. After a threshold number of training iterations, the trained discriminator and the generator can then be employed to detect anomalies in using a combined discrimination and cyber anomaly score (DC-Score).

Figure 7:
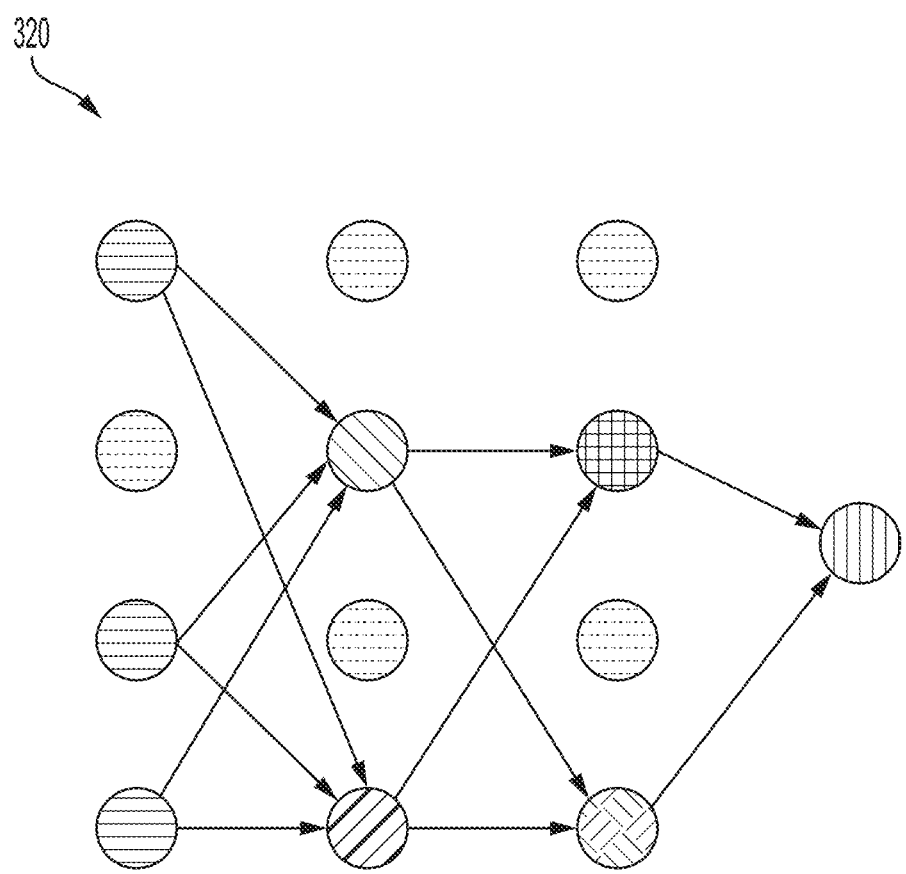
FIG. 7 is a diagram of an LSTM-RNN feature estimator according to an example embodiment.

The trained discriminator can distinguish fake data (e.g., cyber bullying anomalies) from real data with high sensitivity. The trained discriminator serves as a direct tool for anomaly detection. The trained generator, which is capable of generating realistic cyber bullying samples, is a mapping from the latent space to real data space. The LSTM-GAN-trained discriminator and generator can output a set of anomaly detection losses for the LSTM-RNN and LSTM-CNN data points that are estimated during feature estimation. The DC-Score is computed by mapping the anomaly detection loss of sub-sequences back to the original time series data FIG. 7 is a diagram of an LSTM-RNN feature estimator according to an example embodiment. The LSTM-RNN feature estimator 320 leverages two gates to control the content of the unit state c, of which one is the forget gate that determines how much of the unit state ct−1 from the previous moment that is above a determined threshold is retained to the current state ct; and the other input gate determines how much of the input xt is saved to the cell state ct at the current time. The thresholds may vary for the different gates and may be configured through the contract between the user of the electronic device 101 and the user of the electronic device 104. The function used towards the estimation of features is:

$$ft = \text{sigma}(Wf^*[ht-1, xt > \text{threshold}]) + bf$$

"Wf" is the weight matrix of the forget gate" and "bf" is the bias offset for the forget gate.

Figure 8:
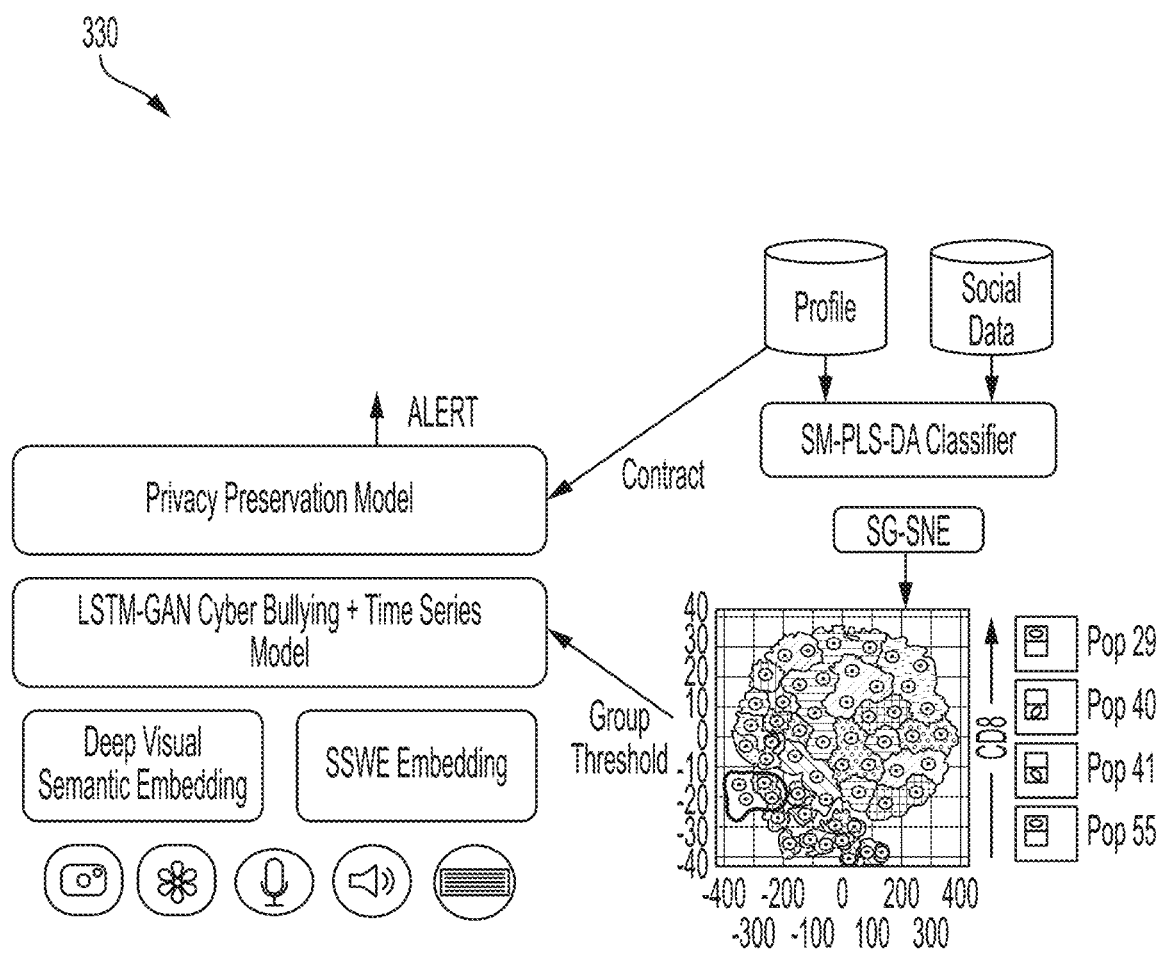
FIG. 8 is a diagram of a classifier according to an example embodiment.

FIG. 8 is a diagram of a classifier according to an example embodiment. The classifier 330 leverages sparse multilevel abuse group classification of social and profile data passed through social group-distributed stochastic neighbor embedding (SG-SNE) across user groups and cyber bullying scenarios such as sexual abuse, intimidation, etc., with thresholds for harassment, flaming, etc.

Figure 9:
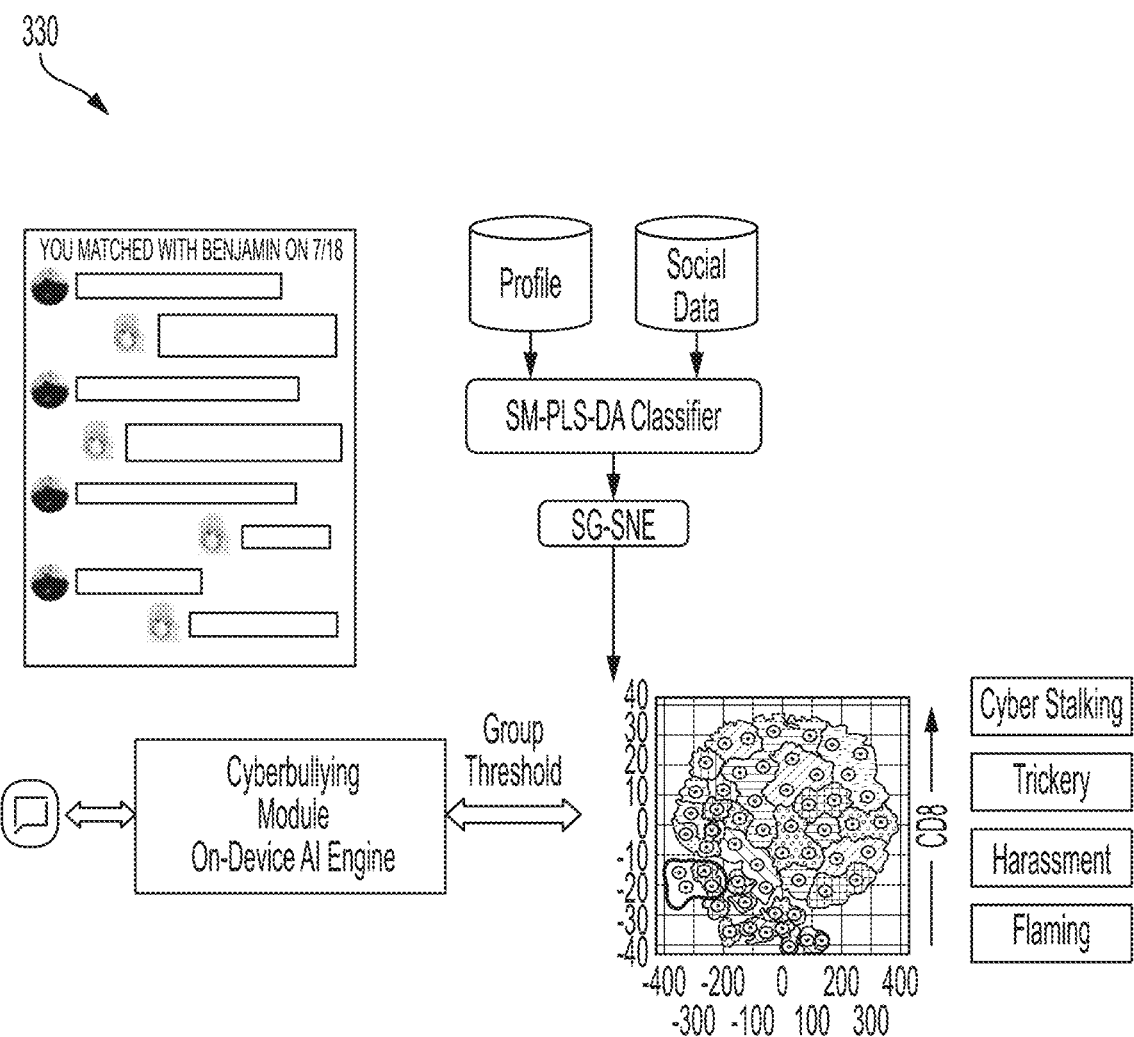
FIG. 9 is a diagram of a diagram of a classifier according to an example embodiment.

FIG. 9 is a diagram of a diagram of a classifier according to an example embodiment. As shown, a user of the electronic device 101 is text messaging another user. The classifier 330 obtains content such as profile data and social data that identifies that two users are teenagers, are friends, and both attend a same school. Further, the classifiers obtains content that identifies that the users have historically used expletive language in a casual manner. The SG-SNE embeds the classified data. The cyberbullying core model 310 uses a group threshold corresponding to the users to detect cyberbullying. In this case, the cyberbullying core model 310 determines that the conversation between the users does not constitute cyberbullying. As another example, the cyberbullying core model 310 may detect cyberbullying based on the classified data indicating that one user is much younger than the other user, that the users are conversing via a social platform, and that the language is explicit.

Figure 10:
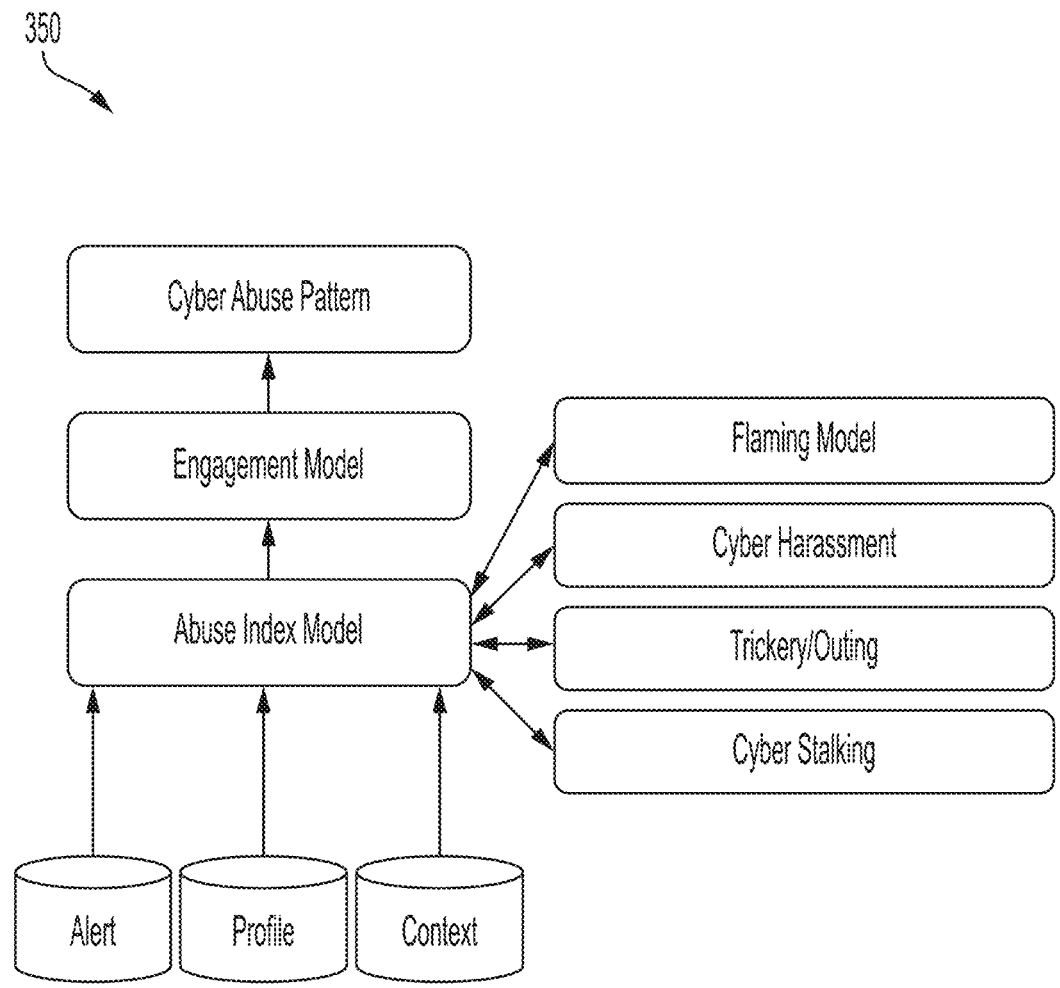
FIG. 10 is a diagram of a time series modeling module according to an example embodiment.

FIG. 10 is a diagram of a time series modeling module according to an example embodiment. According to the time series modeling module 350, the event activity features are vectors in a multi-dimensional space and the distance between the representation vectors characterizes and quantifies the relationships.

Figure 11:
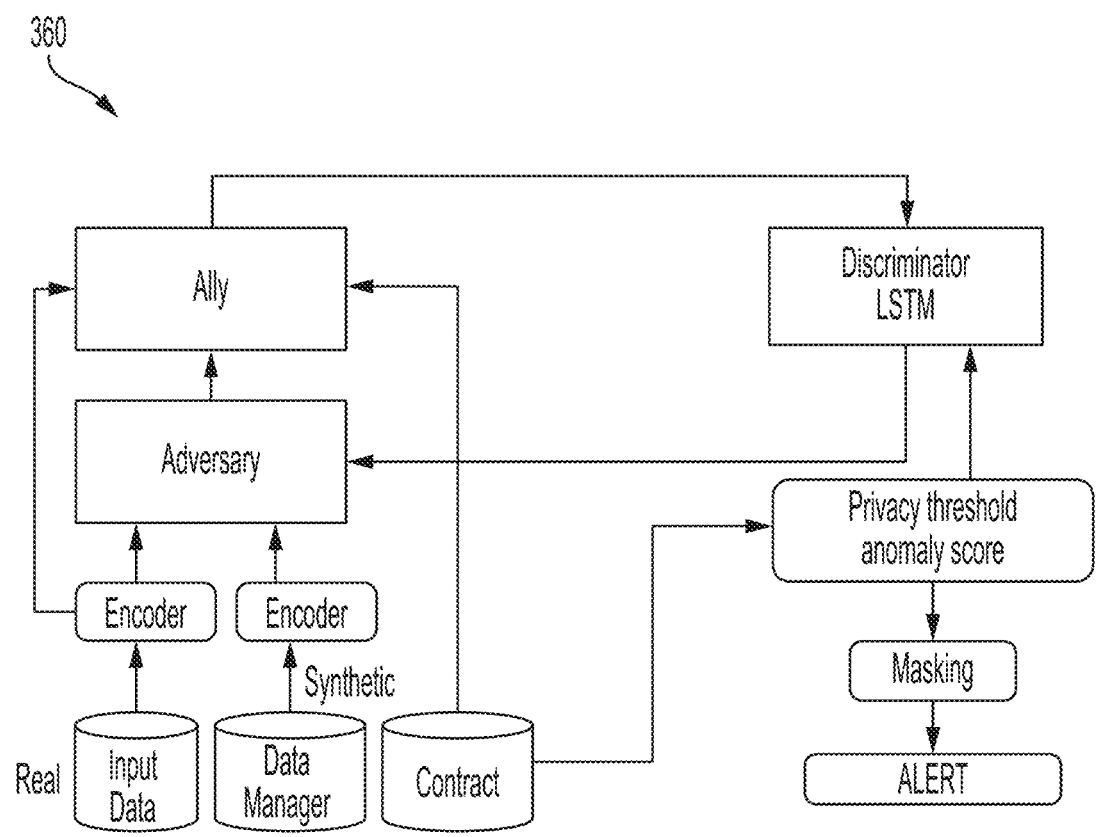
FIG. 11 is a diagram of a privacy preservation module according to an example embodiment.

FIG. 11 is a diagram of a privacy preservation module according to an example embodiment. According to the privacy preservation module 360, the objective includes the adversary that predicts the sensitive data and an ally that prevents the adversary from accessing privacy centric data. The generator feeds both synthetic and refined data with both low sensitive info and sensitive info which is then used by the discriminator to measure and track loss and performance.

Figure 12:
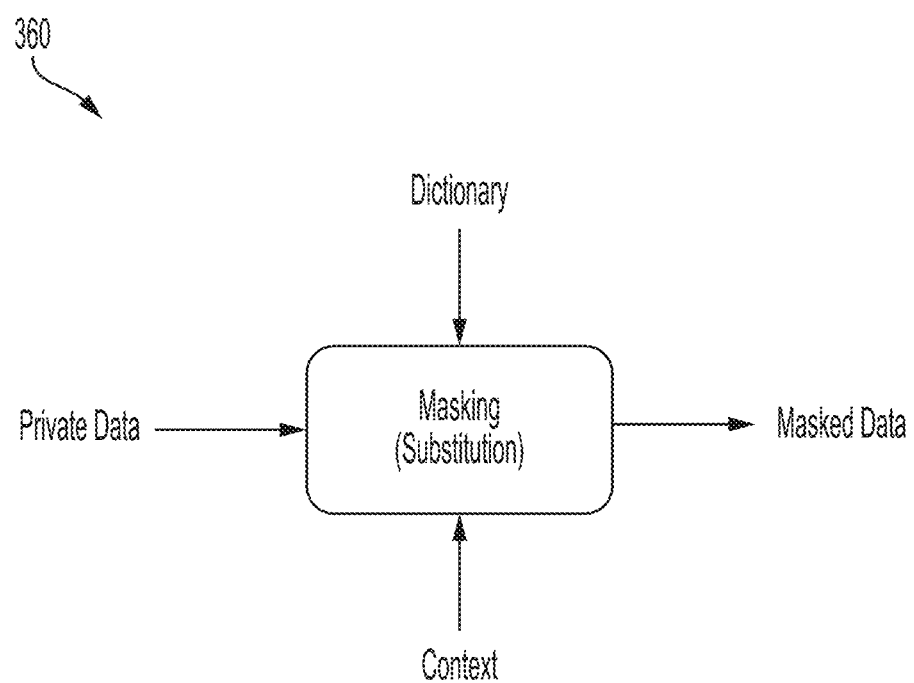
FIG. 12 is a diagram of a privacy preservation module according to an example embodiment.

FIG. 12 is a diagram of a privacy preservation module according to an example embodiment. The privacy preservation module 360 identifies and catalogs various types of data that may be sensitive or private information based on the contract between the user of the electronic device 101 (e.g., the child) and the user of the electronic device 104 (e.g., the parent). This sensitive or private information should be masked out while preserving its usefulness, before showing an alert to the user of the electronic device 104. The privacy preservation module 360 may use a customized masking technique of substitution, which effectively mimics the messaging of real data (for the user of the electronic device 104) without compromising sensitive or personal information (of the user of the electronic device 101). The substitution algorithm uses the context of the user of the electronic device 101 (e.g., who, where, what, and when) given by the cyberbullying core model 310, to select appropriate substitution words for the private information from the dictionary of words. For example, if location (e.g., latitude and longitude) is deemed private by the privacy preservation module, then the location will be substituted by user context information such as "near school" instead of giving an exact location.

Figure 13:
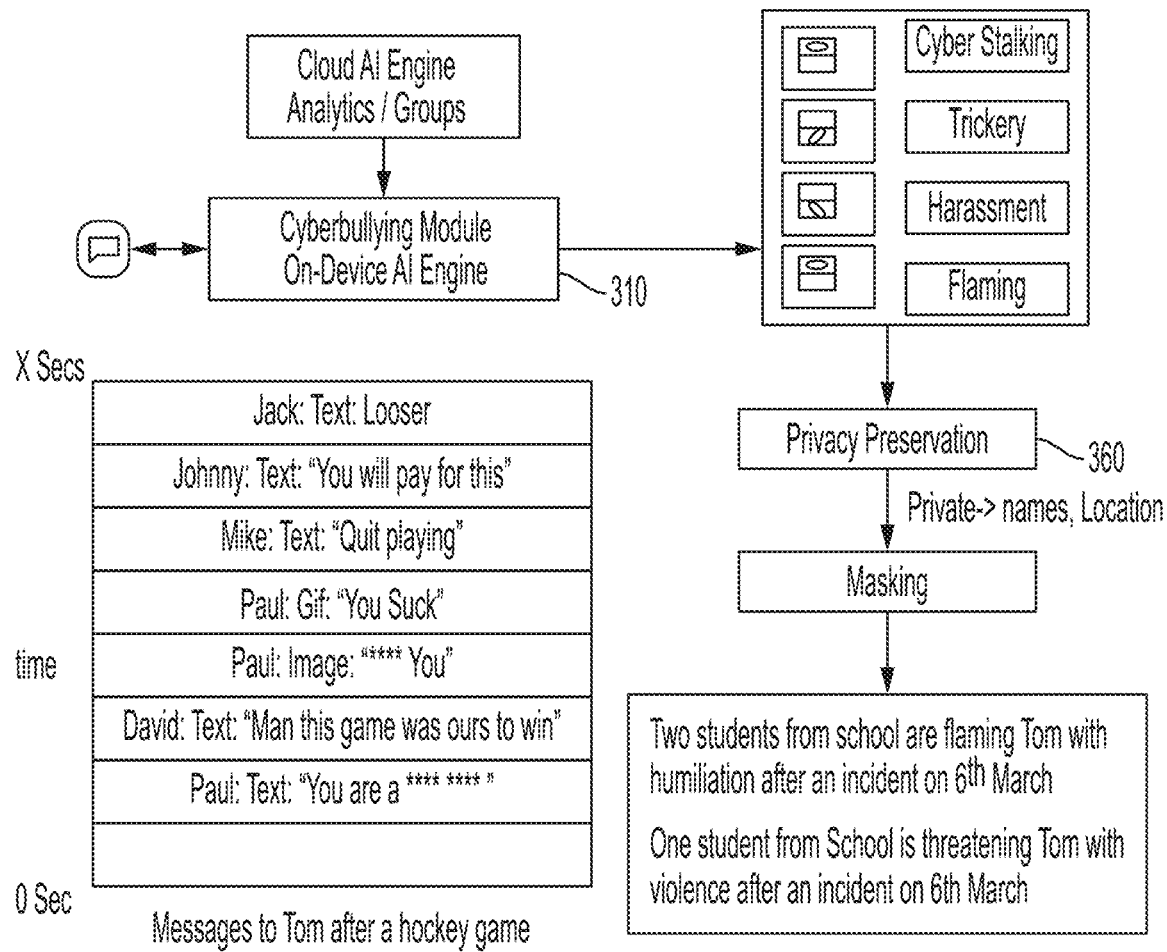
FIG. 13 is a diagram of an example input and output of the AI model according to an example embodiment.

FIG. 13 is a diagram of an example input and output of the AI model according to an example embodiment. As shown in FIG. 13, the cyberbullying core model 310 may obtain content, from the electronic device 101 associated with a user, such as text message content from multiple people. The cyberbullying core model 310 may identify cyberbullying of the user of the electronic device 101 based on the content obtained from the electronic device 101. The electronic device 101 may provide anonymized information, generated by a privacy preservation and masking module 360, related to the cyberbullying to an electronic device 104 associated with another user (e.g., a parent of the user of the electronic device 101).

Figure 14:
FIG. 14 is a diagram of an example user interface according to an example embodiment.

FIG. 14 is a diagram of an example user interface according to an example embodiment. As shown in FIG. 14, the electronic device 101 may display a user interface that permits a user to opt-in to a cyber safe mode. In the cyber safe mode, the electronic device 101 may perform the operations described in FIG. 15 below. Additionally, or alternatively, the electronic device 101 may analyze information input by the user of the electronic device 101, and provide an alert identifying that the input information may constitute cyberbullying of another user (e.g., a recipient of a text message or social media comment).

Figure 15:
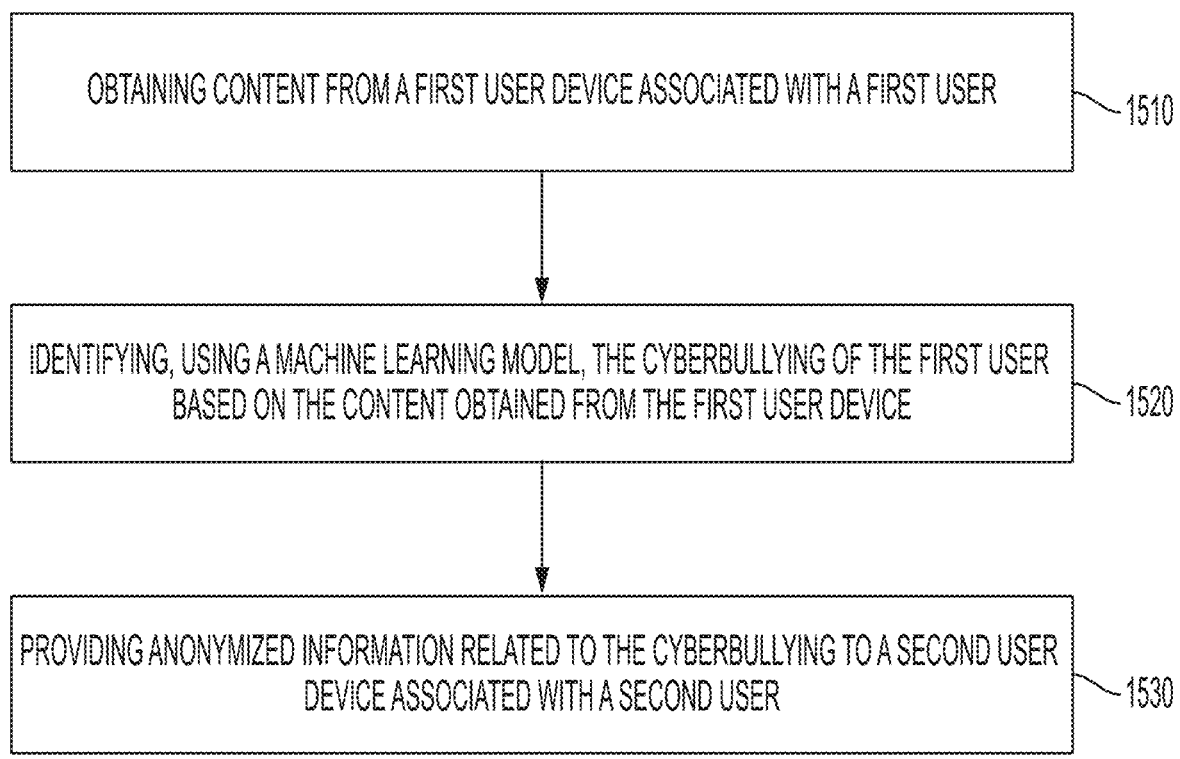
FIG. 15 is a flow chart of a process for identifying cyberbullying according to an example embodiment.

FIG. 15 is a flow chart of a process for identifying cyberbullying according to an example embodiment.

As shown in FIG. 15, the process may include obtaining content from a first electronic device associated with a first user (operation 1510). The electronic device 101 may be associated with a first user (e.g., a child, a person to be monitored, etc.). The electronic device 101 may obtain content from one or more applications of the electronic device 101 such as a social media application, a text messaging application, a phone application, a microphone application, a camera application, a photo gallery application, a GPS application, a location application, a keyboard application, a web-browsing application, a gaming application, or the like. The electronic device 101 may obtain the content based on the first user opting in via a user interface of the electronic device 101.

As further shown in FIG. 15, the process may include identifying, using a machine learning model, the cyberbullying of the first user based on the content obtained from the first electronic device (operation 1520). The electronic device 101 may input the content into a machine learning model. The machine learning model may include the AI model 300 for detecting cyberbullying, which may include the cyberbullying core model 310, the feature estimator 320, the classifier 330, the model bank 340, the time series modeling module 350, and the privacy preservation and masking module 360, as described elsewhere herein.

The electronic device 101 may obtain contract information between the first user and the second user, and input the contract information into the machine learning model.

The contract information may include information that identifies applications from which content can be obtained for identifying cyberbullying.

The contract information may include information that identifies a threshold for identifying cyberbullying. The machine learning model may identify a cyberbulling score based on the content, and the cyberbullying score may be compared to the threshold. For example, a cyberbullying score that exceeds a high threshold would be indicative of particularly egregious cyberbullying, whereas a cyberbullying score that exceeds a low threshold and does not exceed a medium threshold would be indicative of less egregious cyberbullying.

The contract information may include geofence information that identifies a geofence in which the electronic device 101 may identify cyberbullying. For example, the geofence may be associated with a school, a public place, etc.

The contract information may include temporal information that identifies a time at which the electronic device 101 may identify cyberbullying. For example, the temporal information may identify that the electronic device 101 may identify cyberbullying during school hours.

The contract information may include information that identifies a level of anonymization of the anonymized information to be provided to the second electronic device 104. For example, a high anonymization level might identify that more information is to be anonymized, removed, obscured, etc., than as compared to a low anonymization level.

The electronic device 101 may identify the cyberbullying using a hierarchical Long Short-Term Memory-Generative Adversarial Network (LSTM-GAN). Further, the electronic device 101 may identify a group associate with the first user, identify a threshold associated with the group, and identify that a cyberbullying score associated with the content exceeds the threshold associated with the group.

As further shown in FIG. 15, the process may include providing anonymized information related to the cyberbullying to a second electronic device associated with a second user (operation 1530). For example, the electronic device 101 may provide anonymized information to the electronic device 104. As examples, the electronic device 101 may send a message, alert, notification, etc., to the electronic device 104.

The electronic device 104 may generate the anonymized information by anonymizing particular information such as personal identity information (PII) of the cyberbully, the content that constitutes cyberbullying, the application associated with the content, the location of the cyberbullying, or the like. As examples, PII may be a name, an address, a social security number, a number, a code, a telephone number, an email address, an account identifier, etc.

In this way, the electronic device 101 may identify cyberbullying, and provide anonymized information associated with the cyberbullying so that the first user's privacy is not sacrificed.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for identifying cyberbullying, the method comprising:
    obtaining content from a first electronic device associated with a first user;
    identifying, using a machine learning model, cyberbullying of the first user based on the content obtained from the first electronic device;
    obtaining contract information associated with a contract between the first user and a second user, wherein the first user is a child, and wherein the second user is a parent of the child;
    generating first anonymized information related to the cyberbullying based on the contract information;
    providing the first anonymized information related to the cyberbullying to a second electronic device associated with the second user, wherein the providing of the first anonymized information comprises substituting sensitive information with the first anonymized information which mimics real data without compromising the sensitive information, wherein the first anonymized information has been selected from a dictionary of words based on a context of the first user, and wherein the first anonymized information comprises a first set of sensitive information related to the cyberbullying that has been anonymized to a first level of anonymization; and
    providing second anonymized information related to the cyberbullying to a third electronic device associated with a third user, wherein the second anonymized information comprises a second set of sensitive information related to the cyberbullying that has been anonymized to a second level of anonymization, the first level of anonymization being higher than the second level of anonymization.

2. The method of claim 1, wherein the identifying the cyberbullying comprises identifying the cyberbullying using a hierarchical Long Short-Term Memory-Generative Adversarial Network (LSTM-GAN).

3. The method of claim 1, further comprising:
    identifying a group associated with the first user;
    identifying a threshold associated with the group; and
    identifying that a cyberbullying score associated with the content exceeds the threshold associated with the group,
    wherein the identifying of the cyberbullying comprises identifying the cyberbullying based on identifying that the cyberbullying score exceeds the threshold associated with the group.

4. The method of claim 1, wherein the content is associated with at least one of a social media application, a text messaging application, a phone application, a microphone application, a camera application, a photo gallery application, a keyboard application, or a web-browsing application.

5. The method of claim 1, further comprising:
    generating the first anonymized information related to the cyberbullying by removing personal identity information (PII) of a cyberbully associated with the cyberbullying.

6. The method of claim 1, further comprising:
    detecting that an input to the electronic device constitutes cyberbullying; and
    providing an alert identifying that the input constitutes cyberbullying.

7. A device for identifying cyberbullying, the device comprising:
  a memory configured to store instructions; and
  a processor configured to execute the instructions to:
    obtain content associated with a first user;
    identify, using a machine learning model, cyberbullying of the first user based on the content;
    obtain contract information associated with a contract between the first user and a second user, wherein the first user is a child, and wherein the second user is a parent of the child;
    generate first anonymized information related to the cyberbullying based on the contract information;
    provide the first anonymized information related to the cyberbullying to an electronic device associated with the second user, wherein to provide the first anonymized information comprises to substitute sensitive information with the first anonymized information which mimics real data without compromising the sensitive information, wherein the first anonymized information has been selected from a dictionary of words based on a context of the first user, and wherein the first anonymized information comprises a first set of sensitive information related to the cyberbullying that has been anonymized to a first level of anonymization; and
    provide second anonymized information related to the cyberbullying to a third electronic device associated with a third user, wherein the second anonymized information comprises a second set of sensitive information related to the cyberbullying that has been anonymized to a second level of anonymization, the first level of anonymization being higher than the second level of anonymization.

8. The device of claim 7, wherein the processor is further configured to:
  identify the cyberbullying comprises identifying the cyberbullying using a hierarchical Long Short-Term Memory-Generative Adversarial Network (LSTM-GAN).

9. The device of claim 7, wherein the processor is further configured to:
  identify a group associated with the first user;
  identify a threshold associated with the group; and
  identify that a cyberbullying score associated with the content exceeds the threshold associated with the group,
  wherein the processor, when identifying the cyberbullying, is configured to identify the cyberbullying based on identifying that the cyberbullying score exceeds the threshold associated with the group.

10. The device of claim 7, wherein the device is a first electronic device associated with the first user, and wherein the content is associated with at least one of a social media application, a text messaging application, a phone application, a microphone application, a camera application, a photo gallery application, a keyboard application, or a web-browsing application of the device.

11. The device of claim 7, wherein the processor is further configured to:
  generate the first anonymized information related to the cyberbullying by removing personal identity information (PII) of a cyberbully associated with the cyberbullying.

12. The device of claim 7, wherein the processor is further configured to:
  detect that an input to the electronic device constitutes cyberbullying; and
  provide an alert identifying that the input constitutes cyberbullying.

13. The device of claim 7, wherein the device is a cloud server, and wherein the device is configured to obtain the content from a first electronic device associated with the first user.

14. A non-transitory computer-readable medium storing instructions, the instructions comprising one or more instructions that, when executed by one or more processors of a device for identifying cyberbullying, cause the one or more processors to:
  obtain content associated with a first user;
  identify, using a machine learning model, cyberbullying of the first user based on the content;
  obtain contract information associated with a contract between the first user and a second user, wherein the first user is a child, and wherein the second user is a parent of the child;
  generate first anonymized information related to the cyberbullying based on the contract information;
  provide the first anonymized information related to the cyberbullying to an electronic device associated with the second user, wherein to provide the first anonymized information comprises to substitute sensitive information with the first anonymized information which mimics real data without compromising the sensitive information, wherein the first anonymized information has been selected from a dictionary of words based on a context of the first user, and wherein the first anonymized information comprises a first set of sensitive information related to the cyberbullying that has been anonymized to a first level of anonymization; and
  provide second anonymized information related to the cyberbullying to a third electronic device associated with a third user, wherein the second anonymized information comprises a second set of sensitive information related to the cyberbullying that has been anonymized to a second level of anonymization, the first level of anonymization being higher than the second level of anonymization.

15. The non-transitory computer-readable medium of claim 14, wherein the one or more instructions cause the one or more processors to identify the cyberbullying using a hierarchical Long Short-Term Memory-Generative Adversarial Network (LSTM-GAN).

16. The non-transitory computer-readable medium of claim 14, wherein the one or more instructions further cause the one or more processors to:
  identify a group associated with the first user;
  identify a threshold associated with the group; and
  identify that a cyberbullying score associated with the content exceeds the threshold associated with the group.

17. The non-transitory computer-readable medium of claim 14, wherein the one or more instructions cause the one or more processors to generate the first anonymized information related to the cyberbullying by removing personal identity information (PII) of a cyberbully associated with the cyberbullying.

18. The non-transitory computer-readable medium of claim 14, wherein the content is associated with at least one of a social media application, a text messaging application, a phone application, a microphone application, a camera application, a photo gallery application, a keyboard application, or a web-browsing application.

* * * * *